A. W. F. BENNIK.
ROWING APPARATUS.
APPLICATION FILED AUG. 11, 1921.

1,438,688.

Patented Dec. 12, 1922.
5 SHEETS—SHEET 1.

Inventor:
A. W. F. Bennik

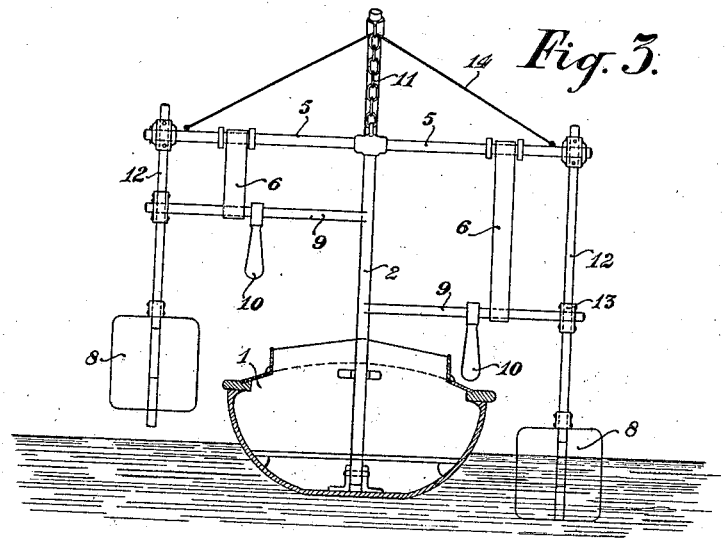
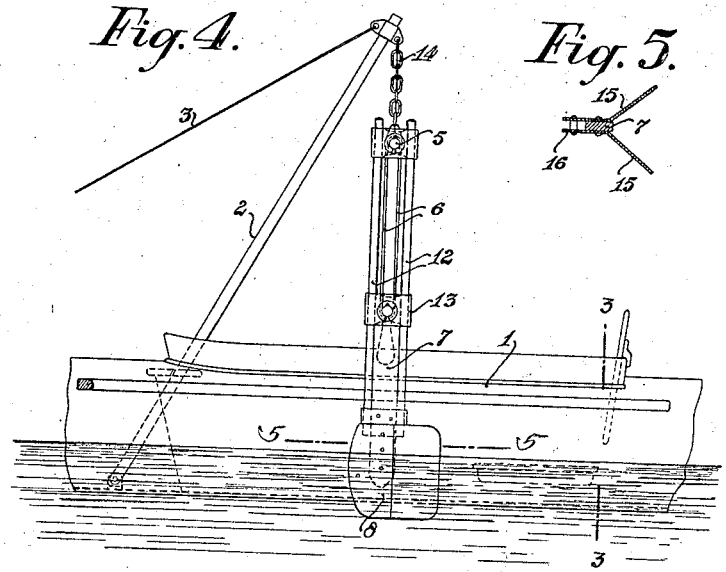

A. W. F. BENNIK.
ROWING APPARATUS.
APPLICATION FILED AUG. 11, 1921.

1,438,688.

Patented Dec. 12, 1922.
5 SHEETS—SHEET 3.

Inventor:
A.W.F.Bennik
By Lawrence Langner
Attorney

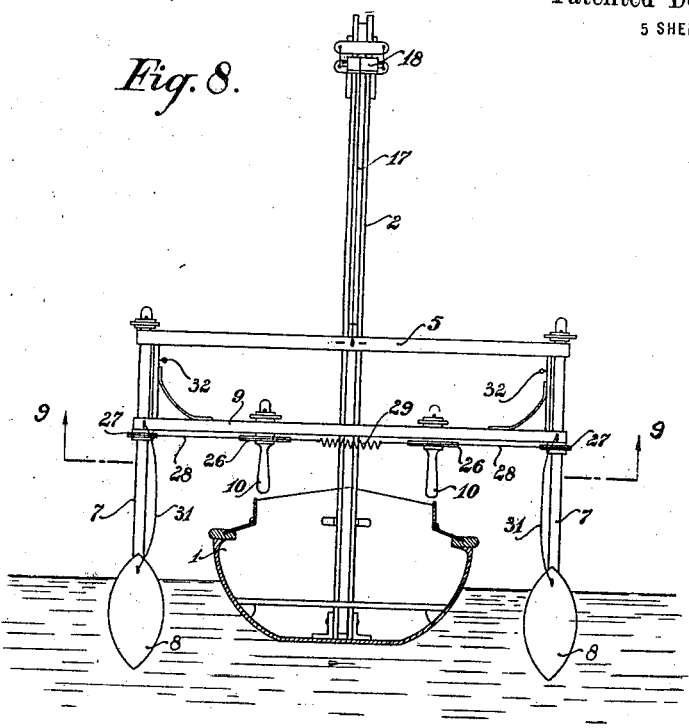
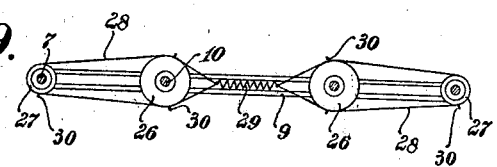
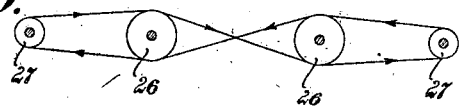

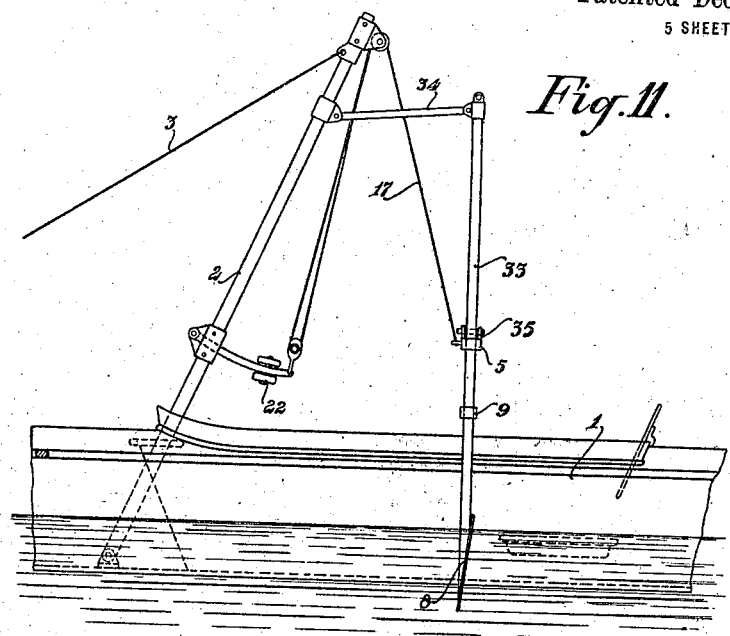
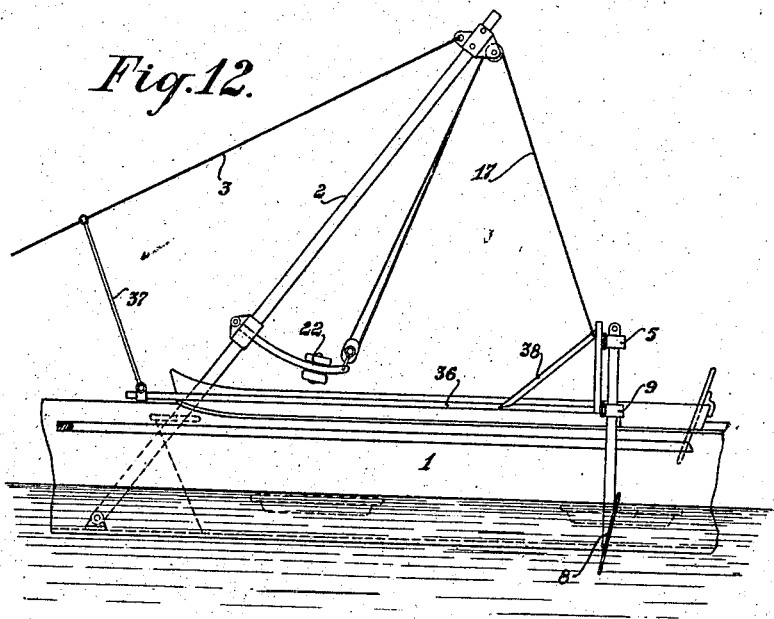

Patented Dec. 12, 1922.

1,438,688

UNITED STATES PATENT OFFICE.

ARIE WILLEM FREDERIK BENNIK, OF DELFT, NETHERLANDS.

ROWING APPARATUS.

Application filed August 11, 1921. Serial No. 491,571.

*To all whom it may concern:*

Be it known that I, ARIE WILLEM FREDERIK BENNIK, a subject of the Queen of the Netherlands, residing at Delft, Netherlands, have invented certain new and useful Improvements in Rowing Apparatus, of which the following is a specification.

Rowing in the ordinary manner, without a coxswain, is tiring because the rower has to turn round every time in order to find whether there is any obstacle in his path. Paddling on the other hand, offers the advantage that one can always see what is in front, though this method of progression is nevertheless attended with the drawback that a considerable twist must be given to the body at each stroke, in order to force the paddle through the water. Moreover, both rowing and paddling have the defect that the oars, or paddle, must be lifted out of the water at each stroke and held on the balance which is exhausting in the long run. A still further serious defect attaching to rowing—and also, though in a minor degree to paddling—is the fact that the propelling implements necessarily project a comparatively long distance on both sides of the boat.

The object of the present invention is to remove the said drawbacks. The new arrangement for this purpose consists of a supporting frame, suspended from a mast or derrick on the boat, and adapted to be drawn down against the action of a resilient body or members or counterweight, the said frame being connected to vertically suspended paddles, on both sides of the boat, in such a manner that these can be moved fore and aft in an approximately vertical position parallel to the plane of symmetry of the boat.

The invention is illustrated in the accompanying drawing, in which—

Figure 1:
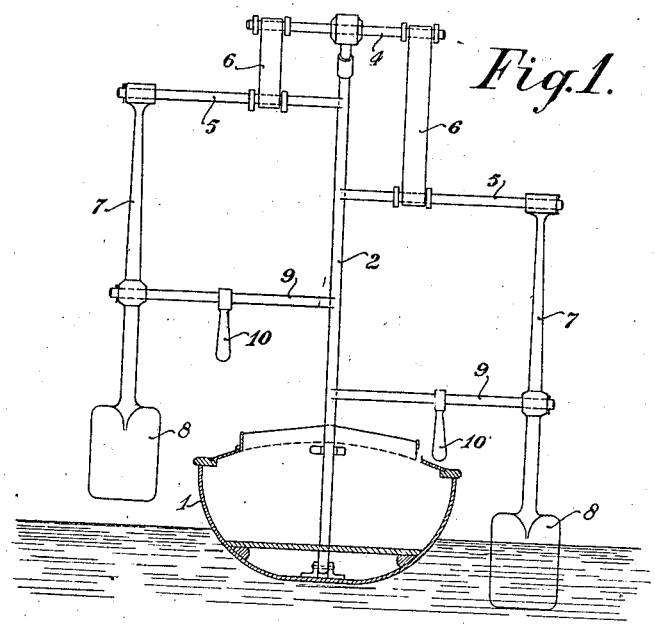
Fig. 1 represents a transverse sectional view of a boat, taken on line 1—1 of Fig. 2, equipped with my novel rowing apparatus.
Figure 2:
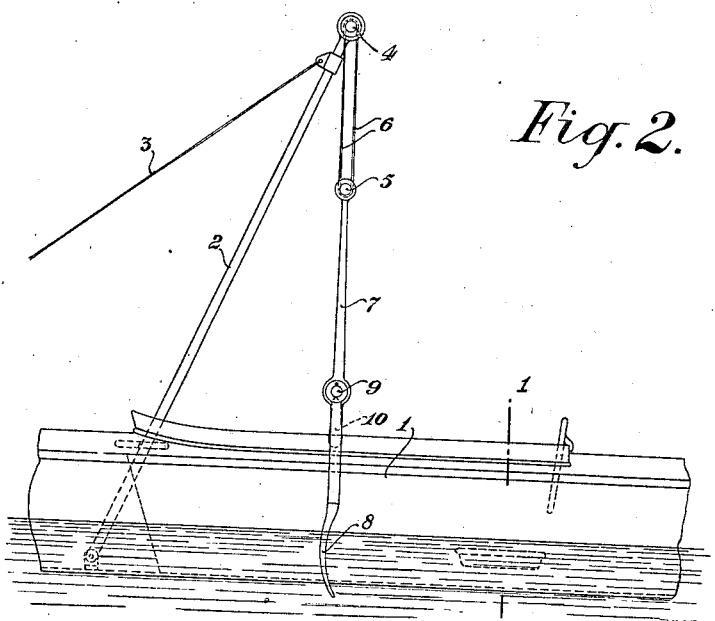
Fig. 2 is a side elevation of the boat and rowing apparatus illustrated in Fig. 1, the fore and aft portions of the boat being broken away.

Figs. 3 and 4 are views similar to Figs. 1 and 2 of a modified form of the invention, Fig. 3 being a transverse sectional view taken on the line 3—3 of Fig. 4.

Fig. 5 is a horizontal sectional view taken on line 5—5 of Fig. 4 and illustrating the structure of the paddle.

Figure 6:
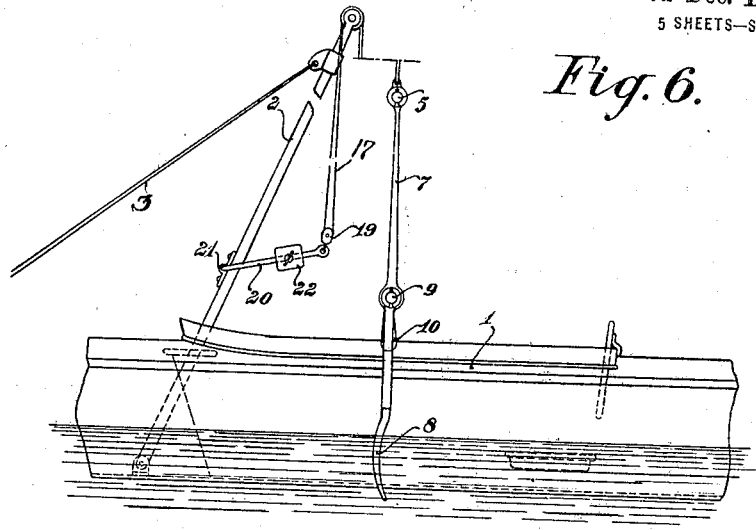
Figure 7:
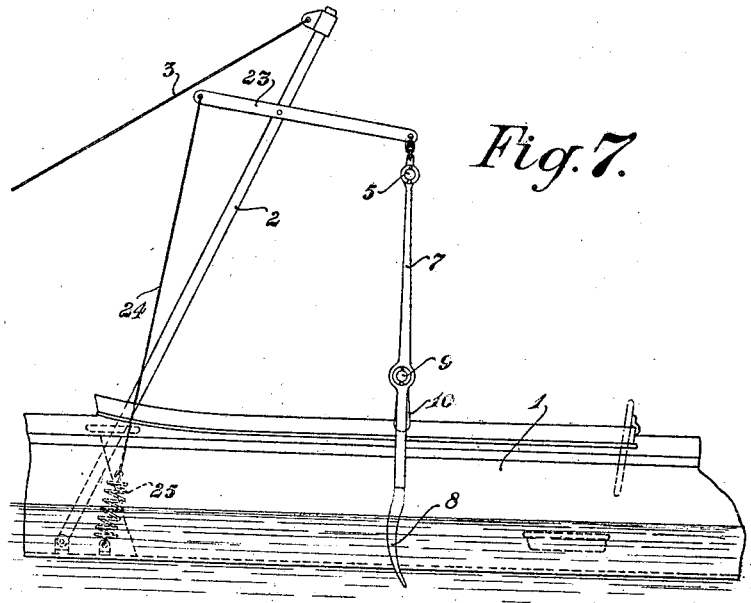

Figs. 6 and 7 are side elevational views similar to Figs. 2 and 4 of further modifications of the invention.

Fig. 8 is a view similar to views 1 and 3 of still another modification.

Fig. 9 is a horizontal sectional view, looking from below, taken on the line 9—9 of Fig. 8, illustrating the means for turning the paddles on their own axes.

Fig. 10 is a view similar to Fig. 9 showing a slight modification of the means for turning the paddles on their own axes.

Figs. 11 and 12 are side elevational views, similar to Figs. 2, 4, 6 and 7 of further modifications.

Referring to Figs. 1 and 2, in the left half of Fig. 1 the rowing apparatus is shown in its highest position, and in the right half of said figure in its lowest position.

The boat 1 is fitted with a mast 2, having a slight rake aft, which is kept in the upright position by a stay 3 extending from the truck of the mast to the bow. This stay passes over a pulley on the bow and backward to the thwart, so that the rower can easily strike the mast. For boats intended to be manned by two or more rowers, a corresponding number of masts can be provided, which are connected by a continuous stay, and thus adapted to be struck simultaneously.

The mast 2 carries the rowing apparatus proper. To its upper end is secured a short horizontal arm 4 on both ends of which is suspended a longer rod 5, projecting on either side of the boat and supported by rubber belts 6 (which might be replaced by helical springs). Stems 7 of vertically suspended paddles 8 are attached in an easily detachable manner to the ends of the rod 5 the said stems being connected, lower down, to two handles 10 by means of a cross-bar 9. The cross-bar 9 is connected to the stems in such a way as to be easily detached.

In the position of rest the paddles 8 are held up equidistant above the water by means of the belts 6. The rower seated in the boat and facing forward, takes hold of the two handles 10, moving them forward and then pulling them downwards and rearwards against the action of the rubber belts 6, so that the paddles are dipped into and pulled through the water, whereupon they are again lifted from the water by an upward movement. This last movement puts no strain on the rower, being effected automatically by the belts 6. Owing to the hereinbefore described method of suspension of the paddles the rower can, if necessary, make a longer stroke with one paddle than with the other, and thus steer the boat.

The boat can be driven ahead or astern by means of the described apparatus, and also swung right round on its own axis. If any obstacle is encountered, the whole apparatus can be moved inboard, by reason of the elasticity of the rubber belts 6 and by loosening the connections between the rods 6 and 9 and the stems 7, the whole apparatus can be taken apart in a few seconds, and, when unshipped, stored in the boat. The whole device being adapted to be constructed almost entirely of wood, it can be very light. An important point is that the boat does not have to be fitted with any rowlocks or outriggers for the oars, and that the paddles can hang down so close to the boat on either side that the boat can be propelled without difficulty, even through very narrow channels.

Figures 3 and 4 illustrate respectively in section 3—3 and in side elevation, a modification of the invention. In this case the cross-bar 5 is suspended from the mast 2 by a chain 11 and carries on both sides, vertically depending guides 12 for guiding shoes 13 to which the stems 7 of the paddles 8 are attached. The two shoes 13 are coupled together by a cross-bar 9, with handles 10, the said cross-bar being suspended by rubber belts 6 from the bar 5. A thin cord or cable 14 serves to prevent the apparatus from inconvenient swaying. In this case again, the highest position of the paddles is represented on the left, and the lowest position on the right of Figure 3.

The paddle (see Figure 5, which represents a section on the line 5—5 in Figure 4) is composed, in this case, of two plates 15 diverging in V shaped form in the rearward direction and secured to stems 7 each of which is also provided with two parallel plates 16 extending in a forward direction. The stem 7, however, extends only part way down the plates 15, 16 so that during the backward movement of the paddles through the water, the latter can flow under the stems 7 and escape towards the front between the plates 16, so that the paddles can be drawn through the water in a straight line. It is obvious that the special form of paddle illustrated in Fig. 5 may be used in any or all of the various forms of the invention illustrated.

In the form according to Figure 6, which represents a side elevation, the cross-bar 5 carrying the paddles 8 is suspended from a rope 17 passing over a pulley 18 at the top of the mast 2 and looping round a pulley 19. The pulley 18 is pivoted on a lever 20, adapted to pivot on the mast 2 at 21 and carrying a sliding weight 22. By means of the weight 22 the two paddles with their connecting bars etc., can be counterbalanced. The working of this device requires no further explanation, beyond mentioning that it is easier, in this case than in the forms already described to move the one paddle more deeply through the water than the other and that no appreciable effort is required in lowering and raising the paddles 8.

Figure 7 shows how the paddles can be suspended from one end of a beam 23 pivoted on the mast 2 the other end of said beam being attached, by means of a rope, cord or cable 24 to a spring 25 secured in the bottom of the boat. If the lever-arm connected to the spring 25 be made shorter than the other, a comparatively short spring will suffice.

Figure 8 represents a front elevation (with the boat in section) of a modification in which the paddles can be swung, by means of the handles 10 about their own axis, so that they have practically no resistance to overcome in their movement through the air.

Figure 9 is a section on the line 9—9 of Figure 8. The paddles 8 (see Figure 8) are pivotally mounted on their own axis (that is on the axial line of their stems 7) on the frame 5, 9, which is suspended from the mast 2 by means of a rope 17 and pulley 18. The counterweight balancing the frame and paddles is not shown in this case. The two handles 10 are rotatably mounted on their own axes, in the frame and each carries a fixed pulley 26, smaller pulleys 27 being mounted on each of the stems 7 at the same height. The two pulleys on the left hand—as also those on the right—are connected together by endless belts 28 (see also Figure 9) which, in turn, are connected together by a helical spring 29. The belts are prevented from slipping on the pulleys by small radial pegs 30 on the pulleys engaging in holes in the belts.

The device is so arranged that the spring 29 keeps the moving paddles parallel to the symmetrical line of the boat. Before drawing the paddles rearward through the water, the handles 10 are turned on their axes so that the plane of the paddles lies transverse to the direction of motion. When the paddles are lifted at the end of the stroke, all that is necessary is to allow the handles 10 to rotate, so that the spring 29 at once turns the planes of the paddles parallel to the symmetrical plane and thus causes them to "feather."

Figure 10 shows how the pulleys 26, 27 on the left and right can also be coupled together by means of a common endless belt. No spring is shown in this case, since in this arrangement helical springs which produce the desired effect, can be arranged for example, round the stems 7 or handles 10. It is obvious that the means for turning the paddles on their own axes illustrated in Figs. 9 and 10 may be used in any or all of the various forms of the invention illustrated.

In order to prevent the paddles from turning on their own axis, all that is required is to tighten two screws 32 in the frame, thus locking the stems, the spring 29 being disconnected if necessary.

Figure 8 also shows loops 31 attached to the stems 7 and intended for the attachment (if desired) of lines, ropes, cord or the equivalent arranged longitudinally, by means of which several rowers seated on different thwarts can pull one and the same pair of paddles through the water.

Figures 11 and 12 show two further constructional forms of the invention. According to Figure 11 the outrigger or carrying frame which is balanced by the weight 22 is provided with an extension rod 33 whose upper end is connected by a stay rod 34 with the mast 2. This connection essentially facilitates the correct movement of the paddle through the water. The outrigger or carrying frame 5, 9, is rotatable relatively to the rod 33 in a plane at right angles to the longitudinal axis of the boat, whereby one paddle can be wetted to a greater extent than the other paddle.

According to Figure 12 the outrigger or carrying frame 5, 9, is connected with a longitudinally arranged rod 36 the forward end of which is suspended by a rod 37 from a stay 3. A rod 38 is provided to brace the rod 36 relatively to the frame 5, 9.

The rod 36 is rotatable in a horizontal plane relatively to the frame 5, 9; the hinge or joint hereinbefore described is not shown in the drawing.

Having now particularly described and ascertained the nature of my said invention and in what manner the same is to be performed, I declare that what I claim is:—

1. Rowing apparatus, comprising a mast adapted to be attached to a boat, and a pair of paddles suspended from said mast by yielding means permitting said paddles to be manually moved downwardly and fore and aft, said yielding means constituting counterbalancing means for said paddles and tending to move them to raised position when released from downward pull.

2. Rowing apparatus, comprising a mast adapted to be attached to a boat, a bar adapted to extend transversely of said boat and a pair of paddles attached to the opposite ends of said bar, said bar being suspended from said mast by yielding means permitting said paddles to be manually moved downwardly and fore and aft, said yielding means normally counter-balancing said paddles in a raised position of the latter and tending to restore them to said raised position when released from downward pull.

3. Rowing apparatus as set forth in claim 1, comprising a pair of handles whereby to manually move said paddles, said handles being operatively connected to said paddles in such manner that the latter can be turned on their own axes by means of said handles.

4. Rowing apparatus as set forth in claim 1, comprising a pair of handles whereby to manually move said paddles, said handles being operatively connected to said paddles in such manner that the latter can be turned on their own axes by means of said handles, and elastic means operatively connected to said paddles and tending to maintain them with their blades in a plane transverse to the longitudinal axis of the boat.

In testimony whereof I affix my signature.

ARIE WILLEM FREDERIK BENNIK.